United States Patent
Lockshaw

[11] Patent Number: 5,425,275
[45] Date of Patent: Jun. 20, 1995

[54] HULL MONITORING APPARATUS AND METHOD

[76] Inventor: James Lockshaw, 16522 Wanderer La., Huntington Beach, Calif. 92649

[21] Appl. No.: 65,927

[22] Filed: May 21, 1993

Related U.S. Application Data

[63] Continuation-in-part of Ser. No. 532,316, Jun. 1, 1990, abandoned, and a continuation-in-part of Ser. No. 853,791, Mar. 19, 1992, abandoned.

[51] Int. Cl.$^6$ ............................................. G01L 1/00
[52] U.S. Cl. ................................... 73/775; 428/344; 428/354; 324/519
[58] Field of Search .................... 73/774–776, 73/786, 802; 324/519, 523, 522; 428/343, 344, 351, 354, 356, 148

[56] References Cited

U.S. PATENT DOCUMENTS

| | | | |
|---|---|---|---|
| 3,058,704 | 10/1962 | Bergstedt | 428/344 |
| 3,092,250 | 6/1963 | Knutson et al. | 428/344 |
| 3,509,942 | 5/1970 | Lindberg | 73/781 |
| 4,258,100 | 3/1981 | Fujitani et al. | 428/354 |
| 4,348,635 | 9/1982 | Wright et al. | 324/519 |

*Primary Examiner*—Robert Raevis
*Attorney, Agent, or Firm*—Louis J. Bachand

[57] ABSTRACT

For detecting strains or breaks in the surface of a boat hull or other structure, the surface is covered with non-intersecting lengths of tape adhered to the surface. The tape has an inner strip of conductive elastomer and an outer strip of the same material, and between them a corrugated layer of copper foil. Both strips and the foil are insulated from each other and the outside. The strips and foil layer are connected to electrical resistance and capacitance measuring devices, which monitor any changes in the electrical properties of the tape lengths, caused by strain or breaking of the surface. Because of the corrugations, the foil will not change its resistance when the tape is elongated or compressed.

4 Claims, 2 Drawing Sheets

HULL MONITORING APPARATUS AND METHOD

This application is a CIP of Ser. No. 07/532,316 filed Jun. 1, 1990 now abandoned and a CIP of Ser. No. 07/853,791 filed Mar. 19, 1992 now abandoned.

FIELD OF THE INVENTION

This invention has to do with the monitoring of stress conditions of vessel hulls both immediately and over time. More particularly, the invention is concerned with the detection, of stress conditions, and with the locating and measuring of stress induced failures, to enable prompt corrective action to avoid hull failure or minimize its effects in a ship or aircraft. The apparatus is also applicable to protection against undetected stress and ultimate failure in structures such as tanks and bridges, such structures, ship and aircraft hulls all being hereinafter referred to as "large structure walls". In an important aspect, the invention relates to the attachment to a hull wall or other structure of a multiplicity of elongated elements having a variable electrical resistance adapted to be proportional to stress experienced in their mounting surfaces and a capacitance proportional to their length. This combination of factors permits the existence and amount of a predetermined level of stress in the hull wall to be sensed through a resistance measure, and, in the event of a hull wall rupture, the location of the rupture to be ascertained through a capacitance measure.

BACKGROUND

Environmental concerns dictate that oil spillage at sea be minimized if not totally eliminated. But shipping is getting older and because of high cost is not being rapidly replaced. Modification of existing shipping hulls to prevent spillage is being discussed but no alternative seems perfect. Minimizing damage from oil spills involves both prevention of spills and containment in the event of a spill. To minimize the likelihood of spills, the present invention motors hull stress conditions so that undue stresses can be detected and histories of stress exposure recorded against the chance of long term hull failure. In addition, in the present invention, the location of a rupture can be readily and quickly ascertained by detecting capacitances of the affected elements. Having determined the locus of the leakage, the affected hull chambers can be pumped down, vacuum can be applied, and containment booms can be deployed accurately.

In U.S. Pat. No. 4,480,480 to Scott, a complex system for integrating energy frequency data from a series of hull points is disclosed. In U.S. Pat. No. 3,596,269 to Laska, specially arranged conductors are placed on a ship hull for the purpose of detecting and monitoring structural failure by change in resistance. The Scott system appears to respond only to failures and no capacitance feature is provided, so that the location as opposed to the existence of a rupture could be determined.

SUMMARY OF THE INVENTION

The present invention contemplates, for structure wall having a smooth surface, an apparatus comprising: a plurality of lengths of tape, the lengths non-intersectingly laid over the surface to substantially cover a portion of the surface; the tape having electrical properties varying with elongation and compression of the tape; means for adhering the lengths onto the surface; and means for measuring electrical properties of any one of the lengths of tape selectively; whereby dimensional change of the tape at a point along the one length of tape, due to strain and breakage of the surface adhering to the tape at the point, will result in changes in the electrical properties of the tape detectable by the means for measuring electrical properties, and alert a user of the apparatus to the strain and breakage.

More particularly, the invention includes an embodiment wherein the tape further comprises: a conductive inner strip adjacent the surface, the inner strip having an inner strip electrical resistance varying with elongation and compression of the inner strip; a conductive outer strip adjacent the inner strip and distal the surface, the outer strip having an outer strip electrical resistance varying with elongation and compression of the outer strip; a conductive foil layer intermediate the inner strip and the outer strip; and dielectric film insulating between the inner strip, the outer strip, the foil layer, and an exterior of the tape.

The invention also includes a particular embodiment wherein the foil layer is corrugated transverse to a direction of linear extension of the tape, whereby elongation and compression of the tape will not change a cross sectional area of the foil layer, and foil layer elongation and compression resistance will not be altered by the elongation and compression.

In other particular embodiments of the invention, the inner strip includes conductive elastomer, or the outer strip includes conductive elastomer. Other particular embodiments of the invention are provided wherein the means for measuring electrical properties includes: means for measuring either one of the inner strip electrical resistance and the outer strip electrical resistance; or means for measuring capacitance between the foil layer and either one of the inner strip and the outer strip; or first means for measuring capacitance between the foil layer and either one of the inner strip and the outer strip at a first end of the one length of tape; and second means for measuring capacitance between the foil layer and the one of the inner strip and the outer strip at a second end of the one length of tape; whereby in the event of a break along the one length of tape two independent measures of capacitance will be available to the user; or, means for measuring a current flowing into an end of either one of the inner strip and the outer strip, the current being a time function of a voltage applied to the end, the voltage being referenced to the foil layer; or, first means for measuring a first current, flowing into a first end of either one of the inner strip and the outer strip, as a first time function of a voltage applied to the first end, and second means for measuring a second current, flowing into a second end of the one of the inner strip and the outer strip, as a second time function of the voltage applied to the second end, the voltage being referenced to the foil layer.

The invention also contemplates detecting tape comprising: a conductive inner strip having an inner strip electrical resistance varying with elongation and compression of the inner strip, a conductive outer strip adjacent the inner strip having an outer strip electrical resistance varying with elongation and compression of the outer strip, a conductive foil layer intermediate the inner strip and the outer strip, and dielectric film insulating between the inner strip, the outer strip, the foil layer, and an exterior of the tape, whereby the tape may be adhered to a structure wall having a smooth surface subject to strain and breakage, and dimensional change of the tape at a point, due to strain and breakage of the surface adhering to the tape at the point, will result in changes in the electrical properties of tape detectable by electrical measuring devices. In a more particular embodiment, the foil layer is corrugated transverse to a direction of linear extension of the tape, whereby elongation and compression of the tape will not change a cross sectional area of the foil layer, and foil layer electrical resistance will not be altered by the elongation and compression. In other particular embodiments, the inner strip includes conductive elastomer, or the outer strip includes conductive elastomer.

The present invention also contemplates a process of detecting strain and breakage in a structure wall having a smooth surface, comprising the steps of: providing a plurality of lengths of tape having electrical properties varying with elongation and compression of the tape, the lengths non-intersectingly laid over the surface to substantially cover a portion of the surface; providing means for adhering the lengths onto the surface; and providing means for measuring electrical properties of any one of the lengths of tape selectively; whereby dimensional change of the tape at a point along the one length of tape, due to strain and breakage of the surface at the point, will result in changes in the electrical properties of the tape detectable by the means for measuring electrical properties.

DESCRIPTION OF THE PREFERRED EMBODIMENT

The present invention is an apparatus for detecting strain and breakage in a structural wall having a smooth surface, such as the hull of a ship or airplane, or similar wall structures which are subject to breakage or strain. Breakage is often preceded by a strain in the wall surface; the invention thus both warns of impending breakage and detects actual breakage. It locates both strain and breakage to a small area so that remedial action can be taken quickly.

Figure 1:
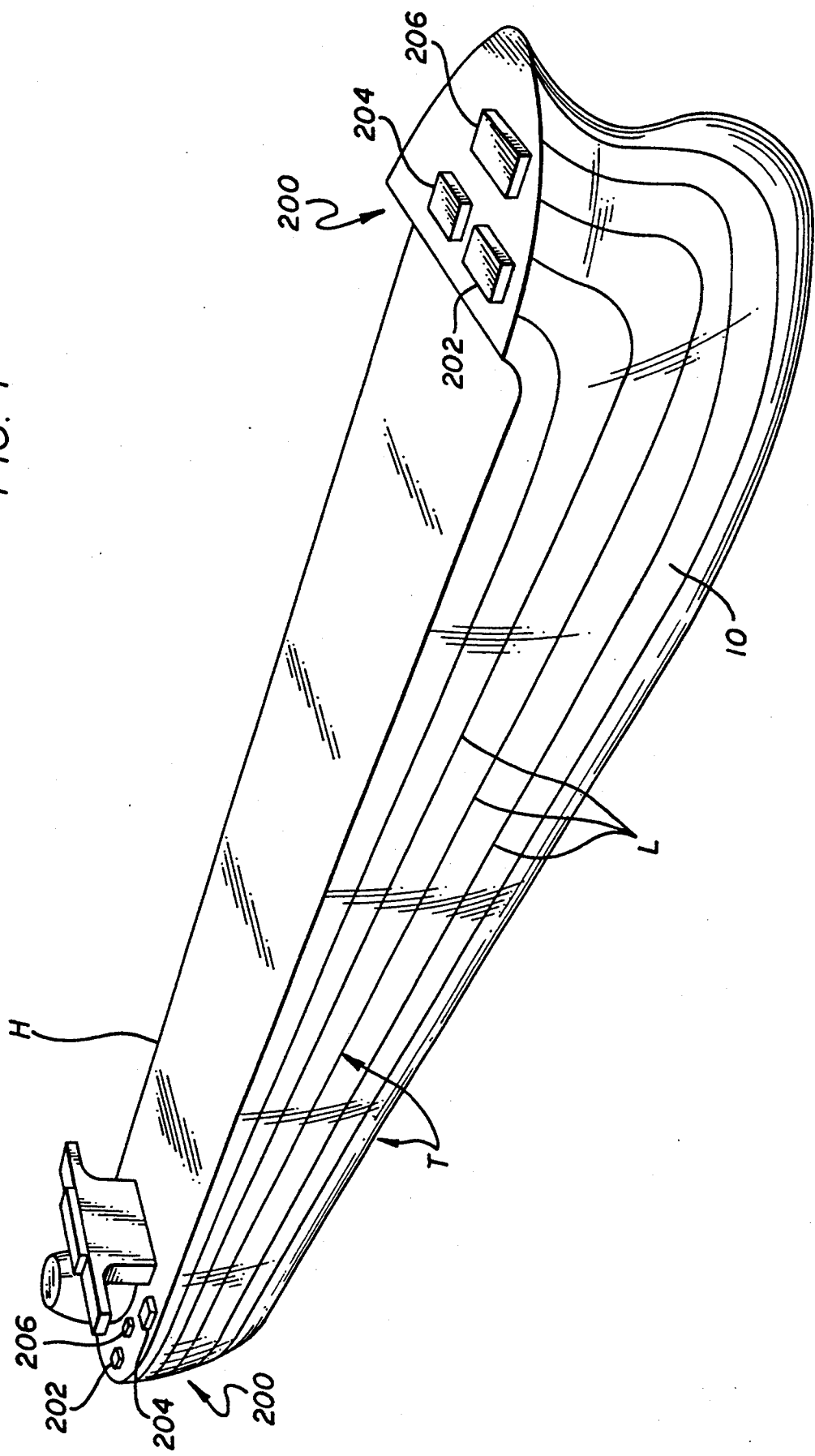
FIG. 1 is a perspective view of a ship's hull showing the tapes of the present invention laid over the hull surface in a non intersecting manner, generally from bow to stern. Means for measuring electrical resistance and capacitance, and current as a function of time, are shown at the bow and at the stern of the ship.

The apparatus of the invention comprises a plurality of lengths L of linear detecting tape T. As shown in FIG. 1, the lengths L are non-intersectingly laid over and adhered to the surface 10 of a ship hull in a generally parallel pattern, so that no point on the surface 10 is far removed from a point on one length L of the tape T. Means 200 for measuring the electrical properties of the lengths L of tape T are shown mounted on the ship deck. These means 200 may be mounted at any position where they can be connected to the ends of the lengths L. The positions shown are merely illustrative. The means 200 include means for measuring resistance 202, means for measuring capacitance 204, and means for measuring charging current as a function of time 206. These are discussed below.

Figure 2:
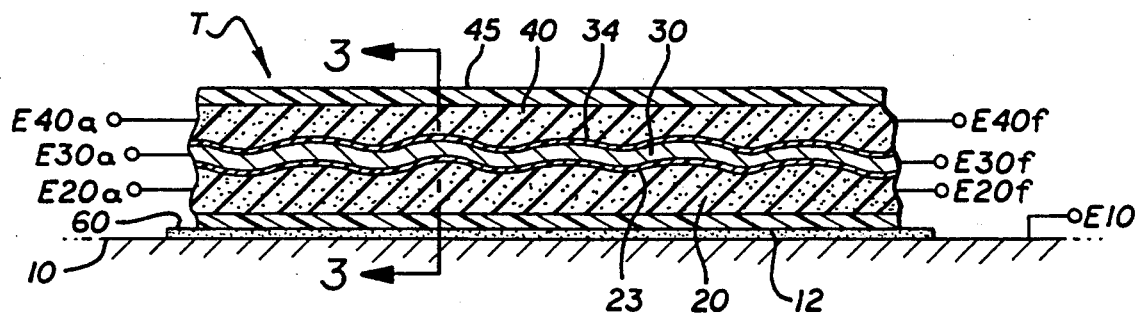
FIG. 2 is a partial, longitudinal cross sectional view of one tape adhered to the ship hull, showing the two conductive strips with a dielectric layer between, and covering material on the outside surfaces of the tape. A schematic view of the means for measuring electrical properties of the tape, to detect strain or breakage, is included in this figure.
Figure 3:
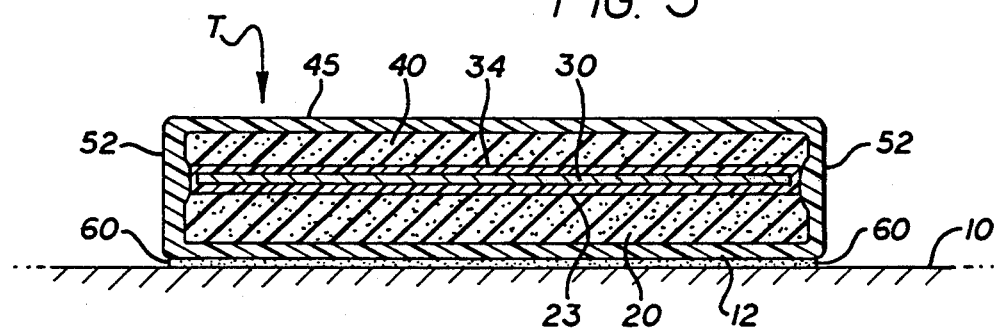
FIG. 3 is a cross sectional view of the tape along line 3—3 of FIG. 2.

The structure of the tape T is best shown in the cross sectional views of FIG. 2 and FIG. 3. Referring to these figures, the hull 10 is the large structure wall or surface of the ship, airplane, or other structure being monitored by the invention. The tape T is shown adhered to the hull 10 by an adhesive layer 60. FIG. 2 is a view along a longitudinal tape section; FIG. 3 shows a section on a plane transverse to the length L of the tape. Fluid, which might be air or water, surrounds the tape T on the outside of the hull 10.

The tape T further comprises an inner conductive elastomer strip 20, an outer conductive elastomer strip 40, and a corrugated conductive layer of foil 30 sandwiched between the strips 20 and 40. The foil layer 30 is preferably a metal such as copper. The two strips 20, 40 and the foil layer 30 may be all of a substantially equal width to avoid waste of material, as shown in FIG. 3. The corrugations in the foil layer 30, which may also be described as waves, folds, undulations, accordion pleats, etc., are transverse to the length L of the tape T. In this Description and in the following claims, a "transverse" corrugated element or surface is one which changes along the length L of the tape, but does not change across the width or height of the tape, as shown in the drawing FIGS. 2 and 3.

At least one of the strips 20 and 40 includes a surface formed to closely follow the corrugated foil layer 30 surface and maintain close spacing, locally, between the strip and the foil layer at all adjacent points.

The strips 20 and 40, the foil layer 30, and the hull 10 are all mutually insulated from one another by non-conductive films 12, 23, and 34. In addition, the entire tape T may be electrically insulated from the fluid by a film 45 on the outer surface of the tape T (that is, on the outer surface of the strip 40 distal the foil layer 30) and optionally by film segments 52 on the sides of the tape T. In the case of a space craft, there would be no fluid and the film 45 could be eliminated.

In order to form the insulating films, strips 20 and 40 may each be encased in a layer of insulating material prior to assembly of the sandwich consisting of strips 20, foil layer 30, and strip 40. Or, the foil layer 30 may be so encased, the sandwich formed, and the entire structure then encased again in an outer envelope (as illustrated in FIG. 3). Any means of insulating the various elements is within the scope of the invention. Any suitable insulating or dielectric material, such as plastic or elastomer, may be used for the film.

Electrical connections, made to ends of the lengths L, are shown on the various portions of the tape T in FIG. 2. The connections are designated schematically by: E10 (hull 10); E20f (strip 20 forward end); E20A (strip 20 after end); E30f (strip 30 forward end); E30a (strip 30 after end); E40f (strip 40 forward end); and E40a (strip 40 after end). The designations "after" and "forward" are used for clarity, and are not be taken as limiting the invention to ships or airplanes. The two ends might as well be designated "first" and "second" irrespectively; in the following claims, they are so designated.

The tape T is adhered in intimate contact with the hull 10. Strong adhesives are available to do this. Once firmly adhered or otherwise fixed to the hull 10, the tape T will follow dimensional changes in the surface of the hull 10. If the surface of the hull 10 stretches, so will the tape T in the same region; if the hull 10 breaks or cracks, so will the tape T.

The tape T is very resilient so as to closely follow any changes of the surface. The corrugations make the foil layer 30 quite easy to stretch or compress in the longitudinal direction, and the conductive elastomer strips 20 and 30 are resilient in all directions. Thus any change in the hull 10 will change the shape of the tape T as well.

When the tape T changes its shape, and in particular when it elongates or compresses, the electrical properties of the tape T will also change.

The resistance of the foil 30 will not change greatly when the tape T is stretched or compressed by dimensional changes in the hull surface 10 to which the tape T is adhered, because of the corrugations the foil will not be strained locally, but rather will be bent slightly. Bending will cause compression on one side of the foil 30 and extension on the other side of the foil 30; in any transverse section there is then no net extension or net compression to change the foil's cross sectional area (unlike a strain gauge, in which a flat foil changes its cross sectional area when the underlying adhered surface strains). Because of the corrugations, the foil layer 30 will not change its electrical resistance when the hull 10 changes its shape. In contrast to the behavior of the foil layer 30, conductive elastomer strips 20 and 40 will change their resistance per unit of length L when stretched or compressed. Conductive elastomers are, typically, insulating plastic materials filled with conductive metal particles. When the elastomer is strained, the particle spacing is changed and so also is the electrical resistance of the conductive elastomer at the strained point. The total resistance of the strip 20 or 40 will therefore change due to local strain of the hull surface.

Because conductive elastomer strips 20 and 40 change resistance as a function of strain, either one of the strips 20, 40 can be used by itself to detect any net stretching of the hull 10 along the length L of the tape. Monitoring of electrical resistance between connections E20f and E20a, for example; or between E40f and E40a, will detect distortion of the hull 10. With a plurality of lengths L of tape T as shown in FIG. 1, areas of hull 10 strain could be located to one or several lengths L of tape T, and thus to a region of the hull 10, by noting which tape lengths L had stretched or compressed. Strain detection can alert the present invention's user to possible hull rupture. The number of ohms of change in the resistance of a length L of tape T can be measured to indicate to the user the degree of hull strain.

Cracking of the hull 10 will lead to tearing of the strip 20 or 40, and essentially infinite resistance in that length L torn. Severe strain of the hull 10 can partially tear the strip, giving a high resistance.

Devices for measuring electrical resistance are well known and readily available, and can be highly accurate. Resistance changes due to variables other than distortion should be minimized. The foil's preferred material, copper, is highly resistant to corrosion in most environments (particularly the salt water environment of ship hulls) and so will not increase its resistance due to loss of material; any gradual loss that occurs can be corrected by re-calibration. Of more concern is temperature variations, which will also change the unit-length resistance of the strip 20 or 40. To correct for temperature variations in resistance, the metal foil layer 30 can be used, indirectly, as a thermometer to continuously monitor the temperature of the elastomer strip 20 or 40. This will allow correction for temperature changes while monitoring the resistance of the strip. The resistivity of copper is a well-known function of temperature. The foil layer 30 is at the same temperature as the strips 20, 40 due to their close proximity to it. The entire length L of tape T will generally be all at the about the same temperature. Changes in the temperature of the foil layer 30 can be calculated or looked up from changes in the electrical resistance of the foil layer 30. The expected change in the resistance of the strips 20, 40 can then be predicted from the change in the strip temperature.

In the present invention, two conductive elements of the tape T can be electrically connected at a first end of a length L, and resistance measured through the two elements in series by connecting the ohmmeter across those two elements at the second end.

As a design choice, resistance in the various lengths L of tape T can be measured by a respective plurality of ohmmeters 202, one for each length L. Alternatively, a single ohmmeter 202 (or a reduced number of ohmmeters) may be selectively connected to any of the various lengths L. In either case, any one of the plurality of lengths L can be measured at will.

The tape T has not only electrical resistance along its main elements 20, 30 and 40, but also capacitance between any two of those elements. There is also capacitance between any element and the surroundings, such as the hull 10 (if conductive) and the surrounding fluid (particularly if water).

These capacitances can be measured by well-known means and commonly available apparatus. As in the case of strip resistance, hull 10 strain or breakage will lead to changes in the respective capacitances, by changing the geometry of the capacitors formed by the elements.

As with the means for measuring resistance 202, the capacitance measurement can be done by single selective or plural dedicated devices 204.

The hull 10 will often be of metal, and so could easily serve as one plate of a capacitor. (The other plate would be strip 20, and the dielectric would be film 12.) This use of the hull 10 is not preferred, since the spacing between the strip 20 and the hull 10 will be hard to control: surface roughness, rivets, varying thickness of adhesive 60, and the like, will all contribute to a lack of uniformity in the value of capacitance per unit length of tape.

The preferred capacitance is between one of the strips 20, 40, and the foil layer 30, with insulating film 23 or 34 serving as the dielectric. In FIG. 2, the capacitance would be measured between one of the following pairs of connections: E20a and E30a; E20f and E30f; E20a and E40a; or E20f and E40f. Whichever strip 20, 40 is not monitored for resistance may be used as the capacitor; the capacitor strip should be correspondingly corrugated on the side facing the foil layer so that no gaps exist, and the conductive elastomer is everywhere separated from the metal by just the thickness of the intermediate film 23 or 34. The close adjacency of the foil layer 30 and the conductive elastomer 20 or 40 will prevent great changes in the capacitance per unit length of tape T when the tape is distorted, since the elastomer will stretch along with the corrugated foil and maintain the separation between them equal to the thickness of the film 23 or 34.

Figure 4:
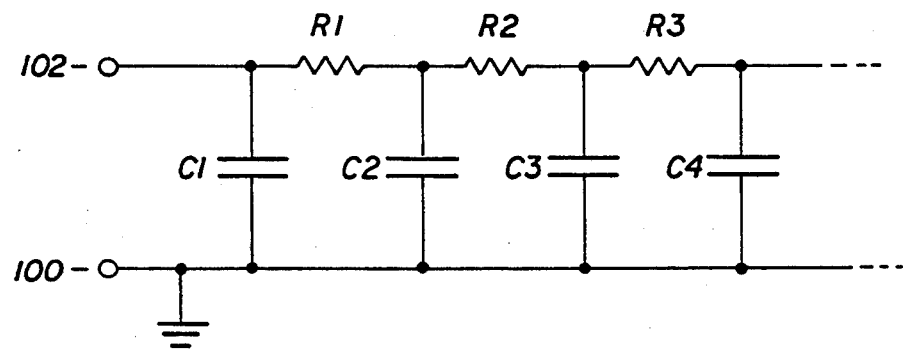
FIG. 4 is a schematic view of an equivalent circuit for the tape.

Due to the relatively great length of the tape T, the length L will not form a simple capacitor, but rather a wave guide capable of propagating voltage signals. This wave guide can be approximated by a network of resistors and capacitors (or RC filter circuit), shown in FIG. 4. The resistance of the strip 20 or 40, which is actually distributed continuously along the strip's length, is represented by the series of resistors R1, R2, R3 . . . while the distributed capacitance is represented by numerous discrete capacitors C1, C2, C3 . . . . The corrugated foil layer 30, with relatively little resistance, is represented by the ground. Terminals 100, 102 are the points of connection from the electrical measuring means 204 or 206 to one end of the length L of the tape T. The circuit of FIG. 4 is called a ladder network. The particular form shown, with resistors in series and capacitors going to ground, is known as Cauer's first form of ladder network. The impedance Z of this network, between the terminals 100 and 102, is given by a continued fraction of the form $$Z = \cfrac{1}{C1 f + \cfrac{1}{R1 + \cfrac{1}{C2 f + \cfrac{1}{R2 + \ldots}}}}$$

where f is the frequency of an applied sinusoidal wave.

Assume at first that all the resistors R have the same value of resistance, and all the capacitors C have the same value of capacitance. This corresponds to the unstrained, uniform length of tape T. Let a single pulse of constant voltage V (i.e., a DC pulse) be applied across the terminals 100, 102 for a time t, and measure the current flowing into the end as a function of time. This current measurement can be performed with readily available, well known equipment such as an oscilloscope. (The present invention is not limited to voltage pulses of any one type, but may include the use of other pulses, continuous waves, and the like.)

Considering that a pulse contains a range of many frequencies f, it will be seen that the charging characteristics of the network, and the length of tape T, will vary with changes in any one or more of the resistances R1, R2, R3 . . . and, moreover, that the particular location of the changed resistance will dictate the nature of the change in impedance, depending upon the frequency component of the pulse. Thus, information about the location of a strain in a length L of tape T will be available from the current charging properties of that length L. Ideally, the resistance of the strip 20 or 40, which is used with the foil layer 30 to form a capacitance, will increase sharply with elongation. If the resistance of the strip is low, and then is suddenly increased at a point, the whole length L can be approximated by two simple capacitors in parallel, commonly grounded and having a resistor between the two charged plates. In the case of long pulses, containing low frequencies, the length L of tape will tend to behave more as a simple parallel plate capacitor and less as a wave guide. If there is actual breakage of a length of tape, the total capacitance of the tape length will be split into two parts. The ratio between the original capacitance and the capacitance of the segment is just the ratio of the original length to the segment length. By applying a low frequency capacitance measurement to the length remaining, the location of the break can be accurately determined. Here, the location accuracy is proportional to the accuracy of the capacitance measurement, given a uniform tape.

To provide greater accuracy, capacitance measurements can be made from both ends of the torn length L of tape, and the resulting distances to the break or strain averaged. In this case, it may be practical to provide measuring devices at either end of a length L of tape T, as shown in FIG. 1.

The invention is not limited to the particular embodiment discussed above, but encompasses everything within the scope of the following claims.

I claim:

1. Detecting tape comprising: a conductive inner strip having an electrical resistance varying with its elongation and compression, a conductive outer strip adjacent said inner strip, said outer strip having an electrical resistance varying with its elongation and compression, a conductive foil layer disposed intermediate said inner and outer strips, and said inner strip, outer strip, and foil layer being insulated from each other by dielectric film, an electrical connector leading from each of said inner strip and said outer strip and said conductive foil, whereby said tape may be adhered to a structure wall surface subject to strain and breakage, and elongation or compressional dimensional change of the tape at a point, due to strain and breakage of said wall surface adhered to said tape at said point results in changes in the electrical properties of tape detectable by electrical measuring devices connected to said electrical connectors.

2. The detecting tape according to claim 1, wherein said inner strip comprises conductive elastomer.

3. The detecting tape according to claim 1, wherein said outer strip comprises conductive elastomer.

4. Detecting tape comprising: a conductive inner strip having an inner strip electrical resistance varying with elongation and compression of the inner strip, a conductive outer strip adjacent the inner strip having an outer strip electrical resistance varying with elongation and compression of the outer strip, a conductive foil layer intermediate said inner strip and said outer strip, and dielectric film insulating said inner strip, said outer strip, and said foil layer from each other, whereby the tape may be adhered to a structure wall surface subject to strain and breakage, and dimensional change of the tape at a point, due to strain and breakage of surface adhering to the tape at the point, will result in changes in the electrical properties of tape detectable by electrical measuring devices, said foil layer being corrugated transverse to the linear extension of said tape, whereby elongation and compression of the tape will not change the cross sectional area of said foil layer, and foil layer electrical resistance is not be altered by said elongation and compression.

* * * * *